A. ZISK.
COOKING UTENSIL.
APPLICATION FILED FEB. 20, 1919.
1,354,085.
Patented Sept. 28, 1920.
2 SHEETS—SHEET 1.
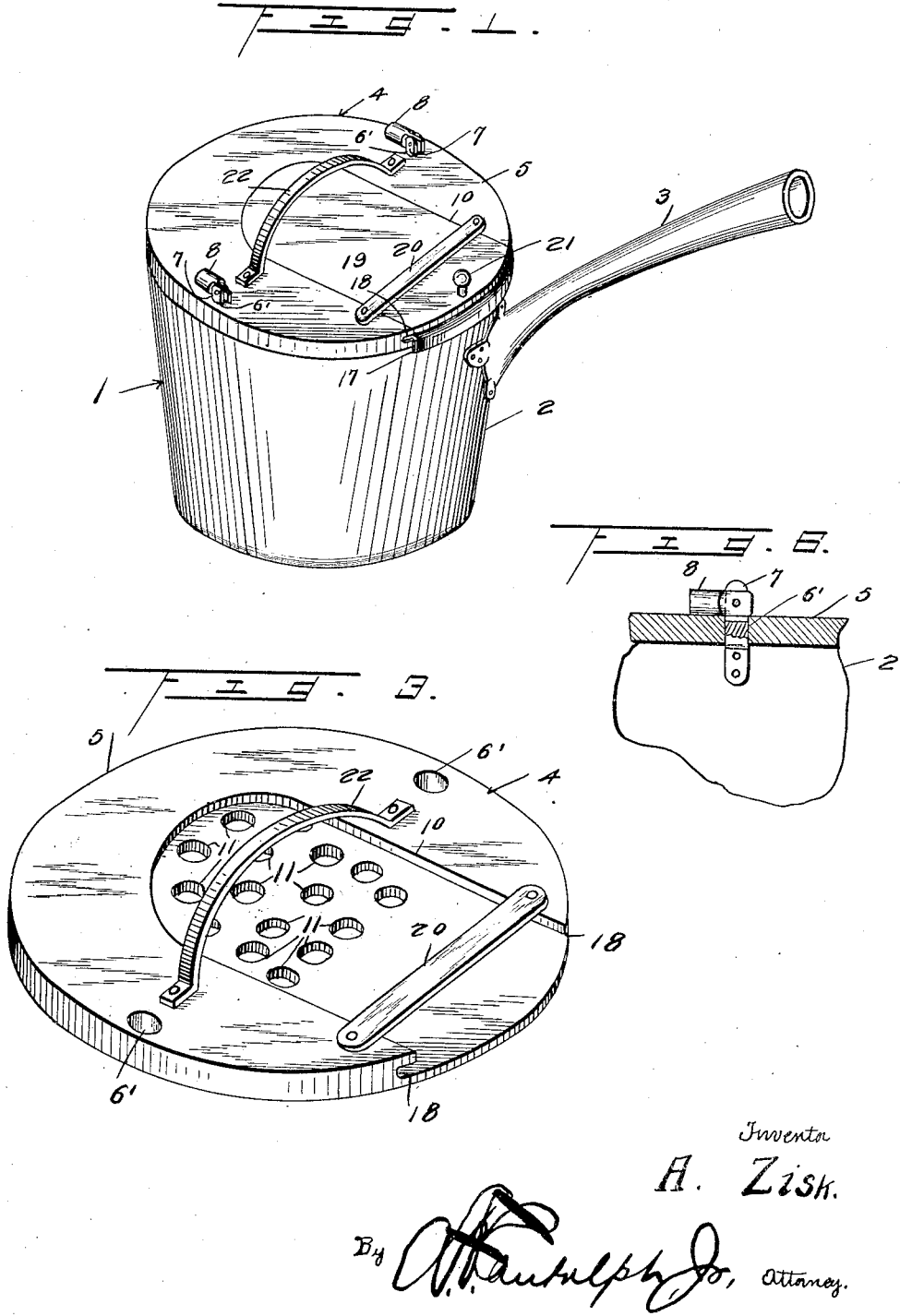
Inventor
A. Zisk.

A. ZISK.
COOKING UTENSIL.
APPLICATION FILED FEB. 20, 1919.
1,354,085.
Patented Sept. 28, 1920.
2 SHEETS—SHEET 2.
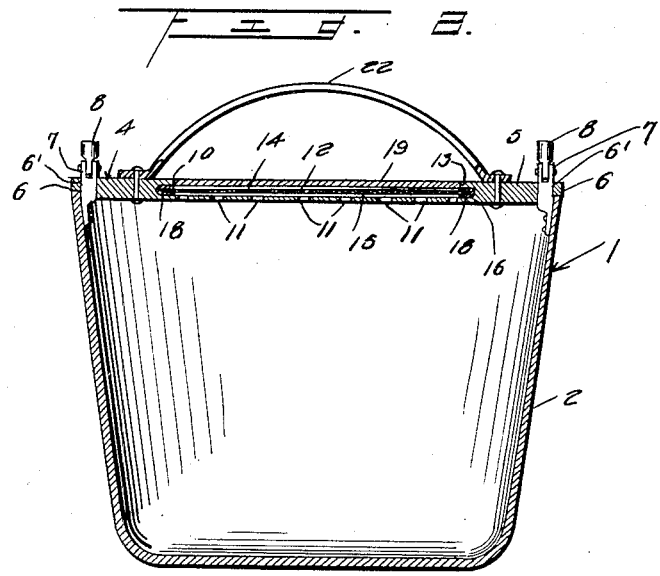
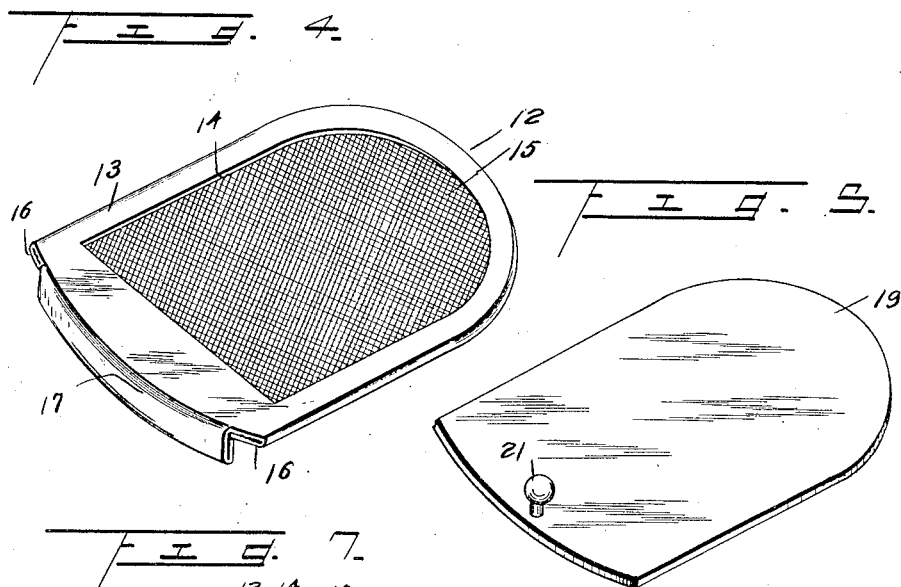
Inventor
A. Zisk.
By
Attorney

UNITED STATES PATENT OFFICE.

ANTHONY ZISK, OF BALTIMORE, MARYLAND.

COOKING UTENSIL.

1,354,085.  Specification of Letters Patent.  Patented Sept. 28, 1920.

Application filed February 20, 1919. Serial No. 278,164.

*To all whom it may concern:*

Be it known that I, ANTHONY ZISK, a citizen of Russia, residing at Baltimore, in the State of Maryland, have invented certain new and useful Improvements in Cooking Utensils; and I do hereby declare the following to be a full, clear, and exact description of the invention, such as will enable others skilled in the art to which it appertains to make and use the same.

This invention relates to cooking utensils and the primary object of the invention is to provide an improved lid or cover therefor having means whereby the water in the utensil can be readily drained therefrom and off of the articles being cooked.

Another object of the invention is to provide means for retaining the food being cooked in the utensil, while draining the water therefrom.

A further object of the invention is to provide an improved lid for cooking utensils having a plurality of openings therein, said openings being adapted, when so desired, to be covered by fine wire mesh or the like, the cover also having means for completely covering the openings so as to retain the heat in the receptacle when cooking the food.

A further object of the invention is to provide improved means for removably securing the lid to the body of the utensil, so as to hold the same against displacement, when the liquid is being drained off of the articles contained in the utensil.

A still further object of the invention is to provide an improved cooking utensil of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a perspective view of the improved lid and cooking utensil.

Fig. 2 is a transverse section of the same cut through the securing devices thereof.

Fig. 3 is a perspective view of the lid removed.

Fig. 4 is a detail perspective view of the sliding screen member.

Fig. 5 is a detail perspective view of the slide.

Fig. 6 is a fragmentary section showing the means for locking the lid in position, and Fig. 7 is a detail longitudinal section through the strainer.

Referring to the drawings in detail, wherein similar reference characters designate corresponding parts throughout the several views, the numeral 1 generally indicates the utensil including the body 2 and the handle 3.

The lid 4 includes a substantially flat circular plate 5 having the outstanding annular peripheral flange 6, which is adapted to rest upon the upper surface of the body 2, and form a tight closure for the same. The plate 5 is provided at opposite diametric points, with apertures 6' which are adapted to receive the upstanding bifurcated lugs 7, which are secured to the body 2. Locking levers 8 having the lower portions thereof reduced in thickness are pivotally secured in the bifurcated portions of the lugs 7. The reduced portions of the locking levers 8 are positioned to engage the upper edge of the plate 5 when the levers are swung at right angles to the studs 7. This construction provides an efficient and ready means for removably locking the lid in place when the device is in use.

The upper surface of the plate 5 is provided with a cutout portion 10 which extends inwardly from one edge thereof to a point beyond the center of the same. The lower wall of the cutout portion 10 is provided with a plurality of drain openings 11, by means of which water may be readily drained off of the contents of the utensil. When small sized vegetables, such as peas, are being cooked, a slidable screen member 12 is employed so as to cover the openings 11 and thus prevent the peas from escaping from the utensil. The screen member 12 includes a flat plate 13 preferably formed of sheet metal having the opening 14 formed therein, which is adapted to be covered by a foraminous or reticulated plate 15 held in position by means of the downwardly inturned edges 16 of the plate which provide retaining flanges for the same. The forward edge of the plate 13 is bent downwardly at right angles to provide a hand grip 17, whereby the screen member 12 may be readily moved into or out of operative position. The side walls of the cutout portion 10 are provided with an inwardly extending groove 18, for slidably receiving the screen member 12 which holds the screen member in place when the utensil is inverted so as to drain the water therefrom. A removable plate 19 is arranged to be slidably received in the cutout portion 10 and is retained in position by a guide strip 20 which extends across the cutout portion 10 adjacent to the outer end thereof. The slide 19 is provided with a hand hold 21, whereby the same may be readily slid into and out of operative position. The sliding cover 19 forms means to prevent the steam from escaping from the vessel, while the food therein is being cooked.

The lid 4 is provided with the ordinary handle 22, whereby the same may be readily removed from or placed into position on the utensil.

From the foregoing description it can be seen that an improved utensil is provided which is so formed that the water can be readily drained from food being cooked in the vessel, without losing any of the contents of the vessel.

In practice, I have found that the form of my invention illustrated in the accompanying drawings and referred to in the above description, as the preferred embodiment, is the most efficient and practical. I desire to emphasize that various minor changes in details of construction, proportion and arrangement of parts may be resorted to, when required without sacrificing any of the advantages of my invention as set forth.

What I claim as new is:

A lid for cooking utensils having the upper portion thereof cut out forming a recess the lower wall of which is provided with relatively large openings, the side edge wall of the recess being provided with grooves, a perforated slide member adapted to fit within the groove, and an imperforate slide member having its edges within the recess above the perforated member and fitting snugly within the edges of the recess and having its upper surface lying in the same plane as that in which the upper surface of the lid lies.

In testimony whereof I affix my signature in presence of two witnesses.

ANTHONY ZISK.

Witnesses:
 FRANK HUYCK,
 JAMES ZISK.